Dec. 24, 1963  M. L. KUBIK  3,115,257
APPARATUS FOR PARKING OF VEHICLES OR THE STORAGE OF ARTICLES
Filed Nov. 25, 1960  9 Sheets-Sheet 1

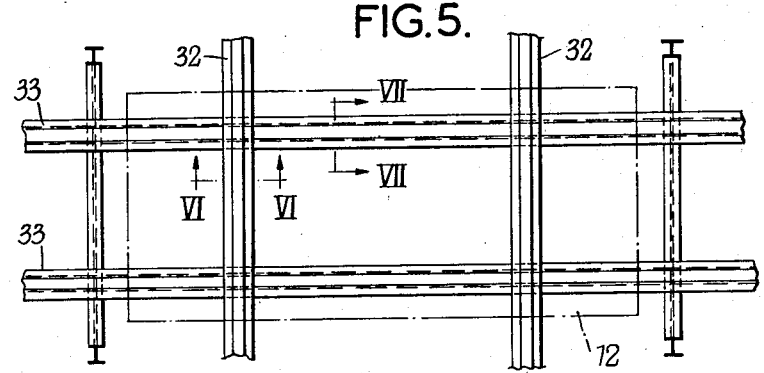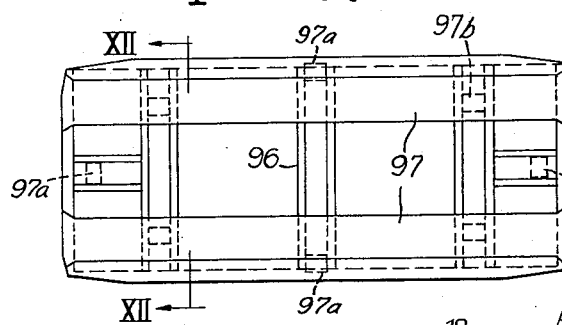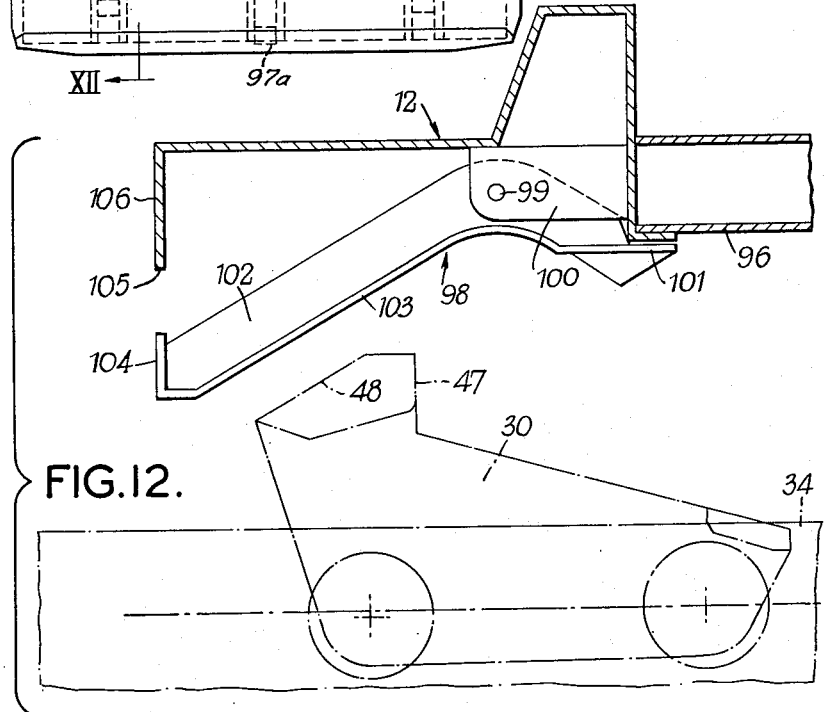

Dec. 24, 1963 M. L. KUBIK 3,115,257
APPARATUS FOR PARKING OF VEHICLES OR THE STORAGE OF ARTICLES
Filed Nov. 25, 1960 9 Sheets-Sheet 4

INVENTOR:—
Marian Leszek Kubik
By Alexander Dowell
attorney

Dec. 24, 1963  M. L. KUBIK  3,115,257
APPARATUS FOR PARKING OF VEHICLES OR THE STORAGE OF ARTICLES
Filed Nov. 25, 1960  9 Sheets-Sheet 5

Dec. 24, 1963                M. L. KUBIK                3,115,257
            APPARATUS FOR PARKING OF VEHICLES OR THE STORAGE OF ARTICLES
Filed Nov. 25, 1960                                   9 Sheets-Sheet 6
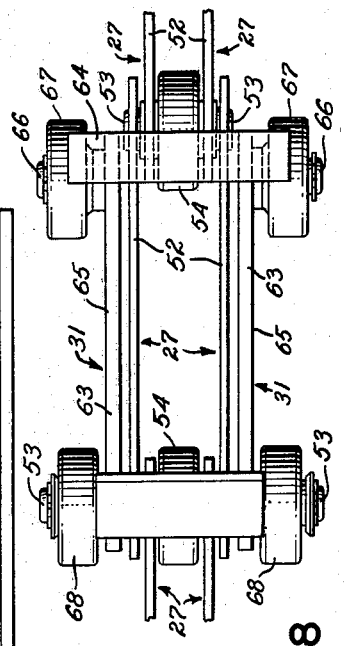
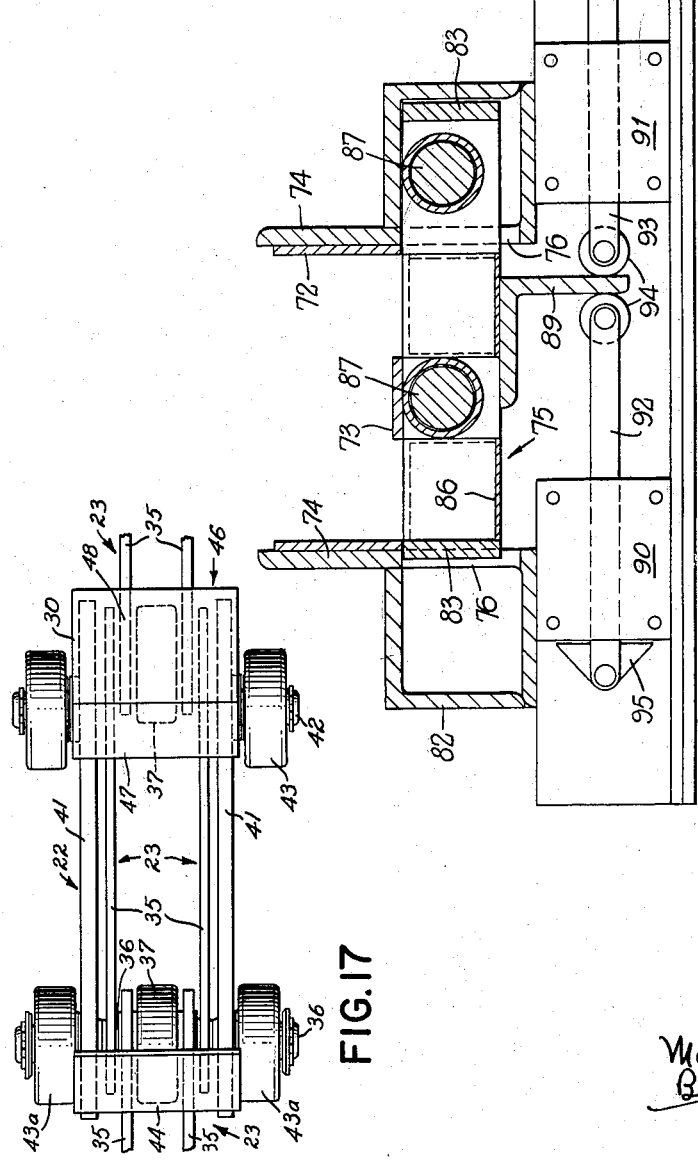

Dec. 24, 1963   M. L. KUBIK   3,115,257
APPARATUS FOR PARKING OF VEHICLES OR THE STORAGE OF ARTICLES
Filed Nov. 25, 1960   9 Sheets-Sheet 7

INVENTOR:-
Marian Leszek Kubik
By Alexander Howell
attorney

Dec. 24, 1963    M. L. KUBIK    3,115,257
APPARATUS FOR PARKING OF VEHICLES OR THE STORAGE OF ARTICLES
Filed Nov. 25, 1960    9 Sheets-Sheet 9

United States Patent Office 3,115,257
Patented Dec. 24, 1963

3,115,257
APPARATUS FOR PARKING OF VEHICLES OR THE STORAGE OF ARTICLES
Marian L. Kubik, Newcastle upon Tyne, England, assignor to Lambhill Ironworks Limited, Newcastle upon Tyne, England
Filed Nov. 25, 1960, Ser. No. 71,508
Claims priority, application Great Britain Nov. 27, 1959
3 Claims. (Cl. 214—16)

This invention relates to structures for mechanically parking vehicles, and for the storage of goods and other articles.

In present types of garages or car parks permanent floors are used for the storage of vehicles, separate ramps, gangways or openings for delivery of cars, whether propelled by the car engine or manually or by special mechanical appliances, being provided for access to each floor. Furthermore passageways have to be kept clear for the vehicles to be manoeuvred and to be parked or withdrawn from the park, and consequentially something of the order of 40% to 50% of the floor area is wasted from the point of view of being available for parking vehicles. Where the vehicles are not delivered to and withdrawn from the parking position by the vehicles engine but are delivered by mechanically operated vehicle equipment, breakdown of this equipment renders at least that floor inoperative both for delivery and parking of vehicles.

It is an object of the present invention to provide a structure which avoids this difficulty.

The invention is more particularly applicable to multistory parking structures in which case a lift or lifts is or are available for carrying the vehicles up to the desired floor upon which they are to be parked.

According to the present invention a structure for parking vehicles, or for storing other articles, comprises a floor arrangement having a plurality of longitudinal and transverse lanes, a conveyor system including a conveyor unit in each longitudinal and transverse lane, and means for introducing into at least one longitudinal or transverse lane a vehicle to be parked or an article to be stored, the arrangement being such that when introduced into the lane the longitudinal and transverse conveyors can move the vehicle or article to any desired position in the lanes by moving that vehicle or article at will either transversely or longitudinally.

To facilitate movement of the vehicles or other articles it is preferred to introduce the vehicles into the parking conveyor system on a pallet which co-operates with the conveyors to be moved transversely or longitudinally and thus overcome the problem of handling upon the conveyor system vehicles or articles of different shapes and sizes. Conveniently, the structure is under the control of an operator who is positioned so as to see clearly the floor on to which the vehicle or article is to be moved or is provided with an electrically operated and illuminated key plan by which the operator can position any car to be parked.

In a preferred arrangement the longitudinal and transverse conveyors forming the conveyor system of the structure are arranged to run one under the other at least where they cross or intersect in the system.

Dogs or the like catch elements are provided on the chains of the conveyors of the system for engaging the pallets, and in order to prevent the dogs on the longitudinal chains fouling the transverse chains or vice versa, means are provided for retracting or dropping the dogs on, for example, the chains of the longitudinal conveyor, at appropriate positions so that the dogs will not foul the transverse chains as the latter run under or over them.

For a better understanding of the invention and to show how the same may be carried into effect reference will now be made to the accompanying drawings in which.

Figure 1:
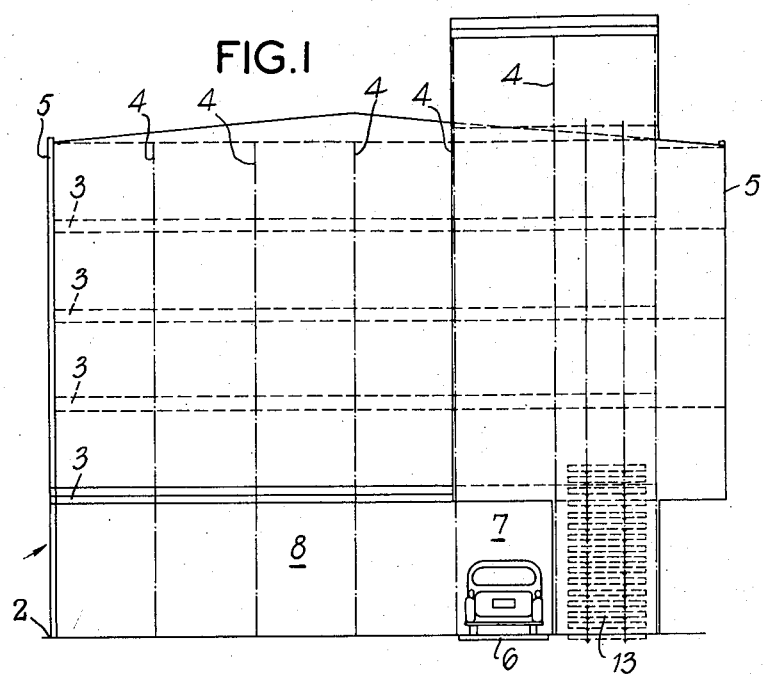
FIGURE 1 is an elevation of a structure for mechanically parking vehicles or for storing goods or other articles.
Figure 4:
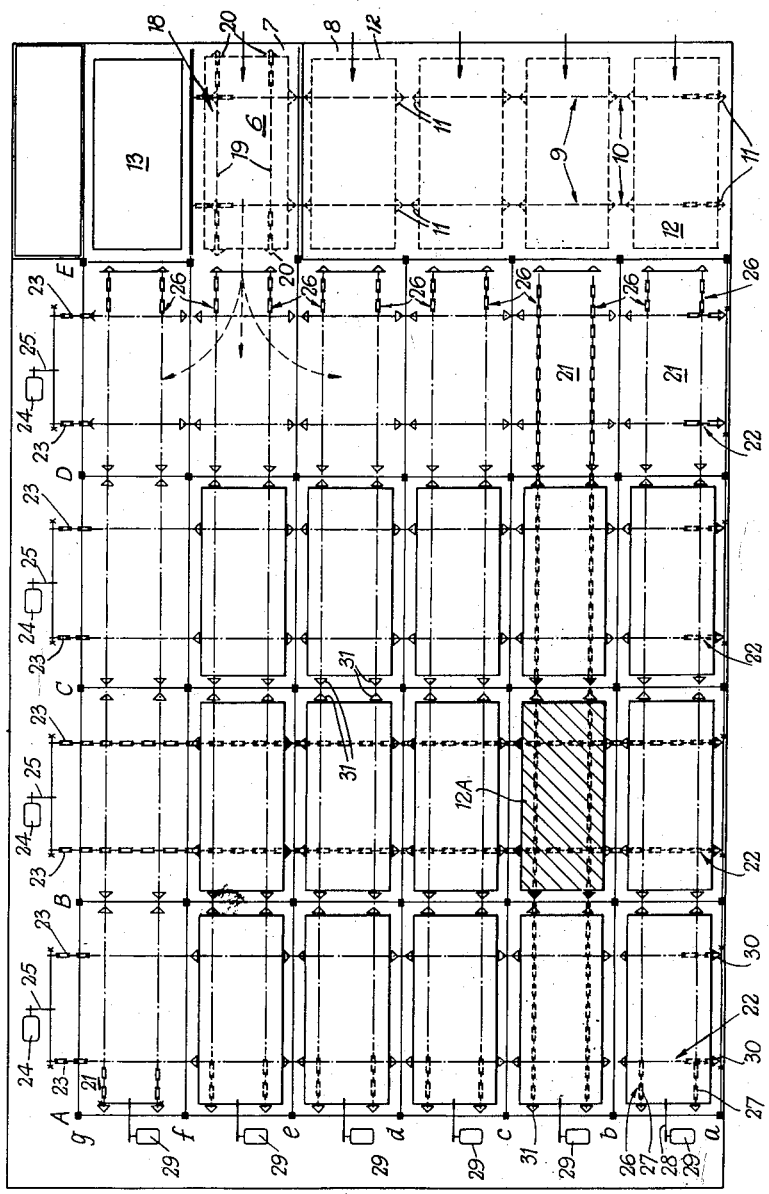
Figure 6:
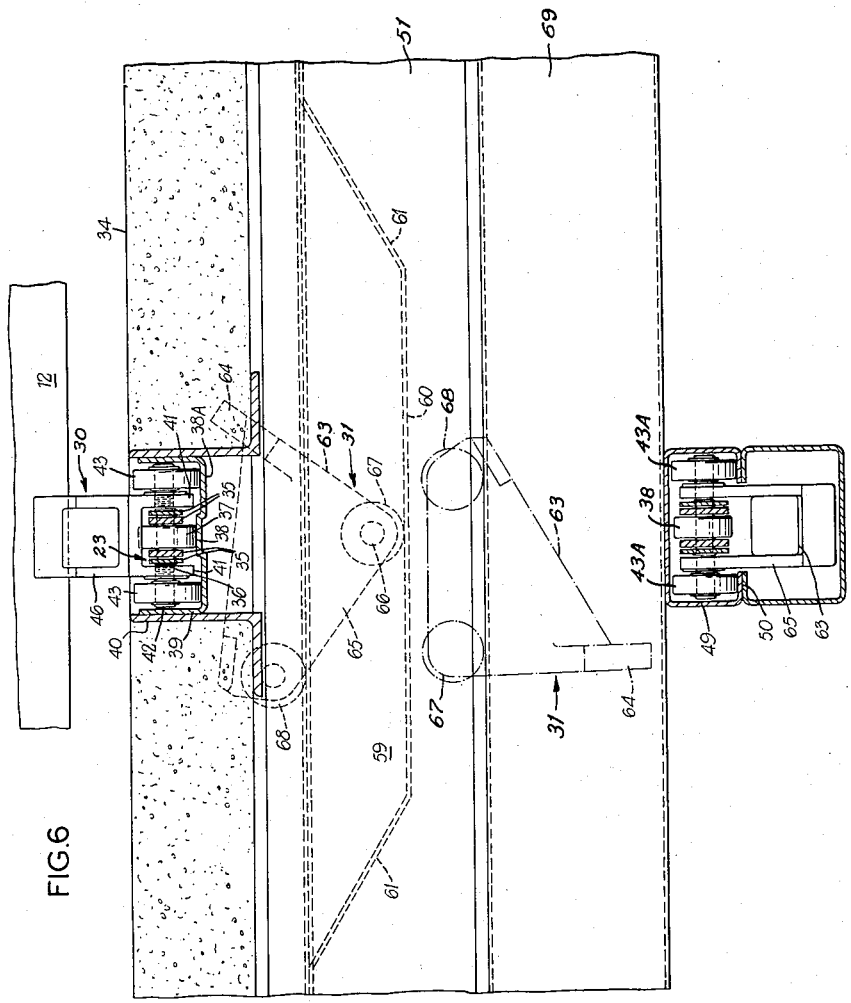
Figure 7:
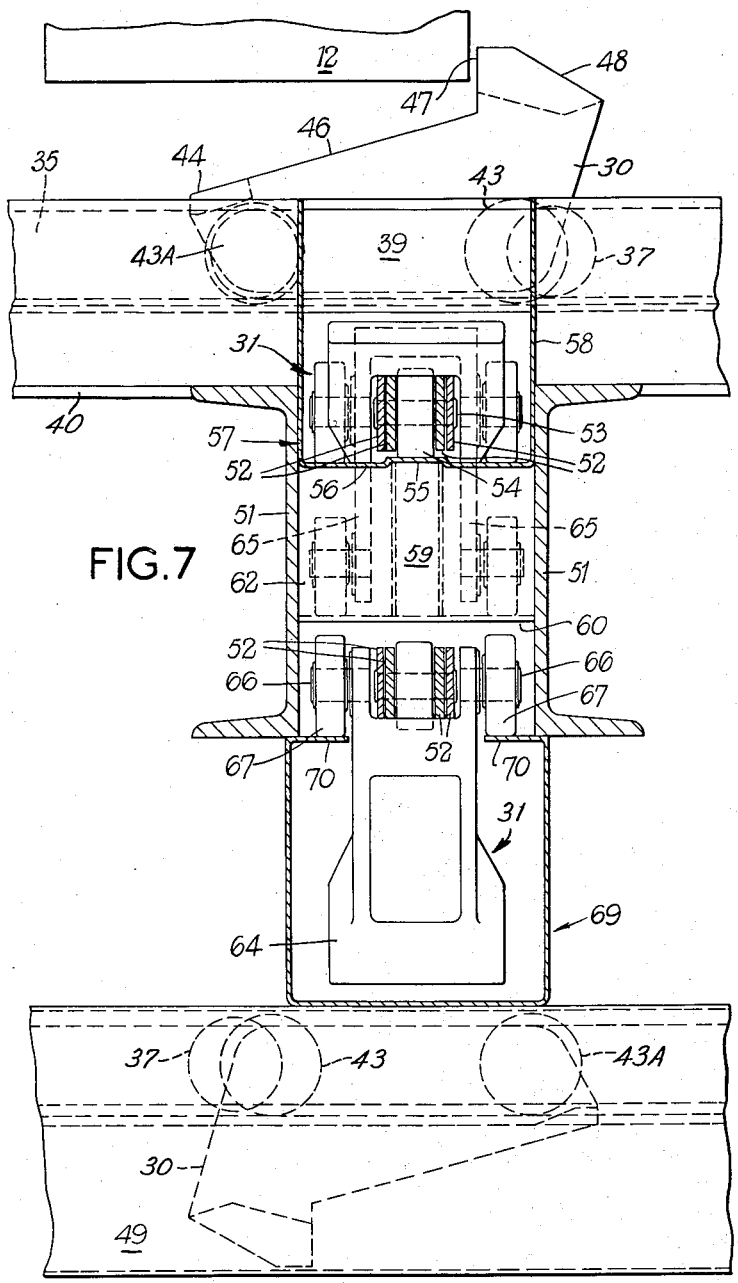
Figure 9:
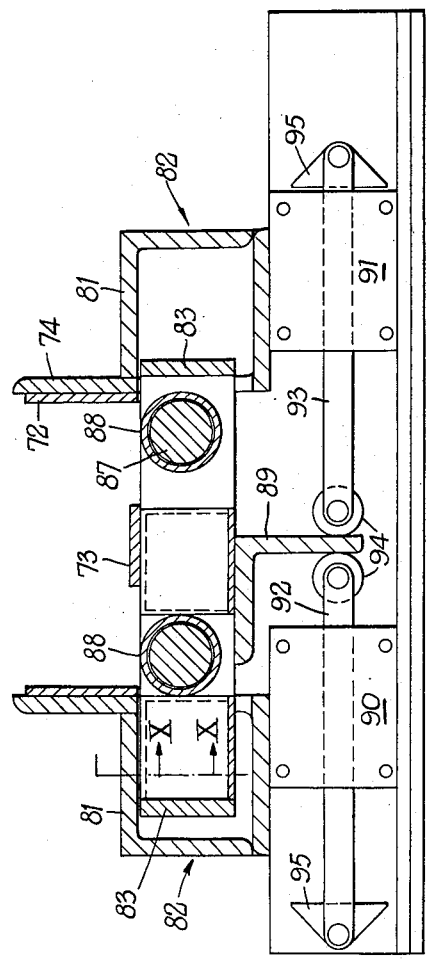
Figure 10:
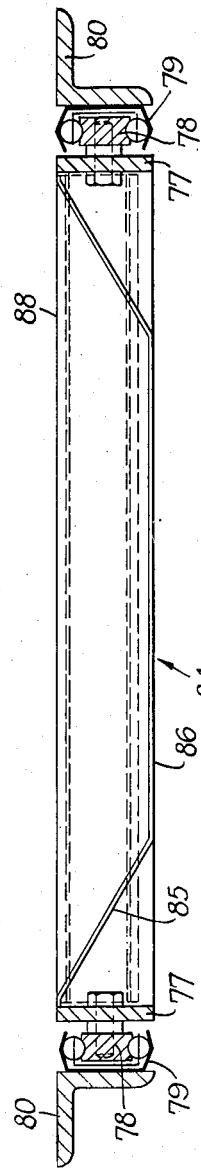

FIGURE 4 schematically represents a typical floor plan of the structure shown in FIGURE 1, FIGURE 4 schematically illustrating the layout of conveyors of a conveyor system which is adapted to transport load carrying pallets relative to the floor of the structure;

FIGURE 5 illustrates to an enlarged scale a fragmentary portion of the conveyor layout of FIGURE 4;

FIGURE 6 is an enlarged section taken on the line VI—VI of FIGURE 5;

FIGURE 7 is a section on an enlarged scale taken on the line VII—VII of FIGURE 5;

FIGURE 8 is a fragmentary cross-sectional view of a unit for controlling the operation of a conveyor pallet engaging element, the unit being in a first operative setting;

FIGURE 9 is a part cross-sectional view of the unit shown in FIGURE 8 but when the unit is in its second operative setting;

FIGURE 10 is a section on the line X—X of FIGURE 9;

FIGURE 11 is a plan view of a pallet which is intended to co-operate with dogs provided on the conveyors;

FIGURE 12 is a part section on the line XII—XII of FIGURE 11;

FIGURES 13 to 16 are schematic figures illustrating the various stages involved in the movement of a particular load carrying pallet from a storage position to the delivery position;

FIG. 17 is a plan view showing a portion of a transverse conveyor chain and conveyor dog arrangement; and FIG. 18 is a plan view similar to FIG. 17 but showing a portion of a longitudinal conveyor chain and conveyor dog arrangement.

Referring particularly to FIGURES 1 to 4, the structure schematically shown therein is intended particularly for the parking or storage of vehicles or other bulky articles. The structure comprises essentially a multistory building structure 1 consisting solely of an internal skeleton or framework on or in which a conveyor system is installed on each floor. The structure 1 shown in FIGURE 1 has a ground floor 2 and four floors 3 above the ground floor 2 which are carried by the verticals 4 of the structure, (schematically indicated by chain dotted lines) and the outer walls 5 of the structure. These verticals 4 can be of steel sections or reinforced concrete. The separation between the verticals 4 of the structure is such that they do not interfere with the conveyor arrangements which are used to move the vehicles or other articles within the structure.

Conveniently the floors along which the conveyors run consist of steel sections with plate or grill fillings or precast concrete formed to suit conveyor pulling and drive mountings as is required by the design of the structure or any official byelaws or requirements.

Access to the floors 3 is via a lift 6 which is located in a lift well 7 provided at one end of the structure 1. If desired more than one lift can be used, although only one lift is shown in the accompanying drawings.

Vehicles to be parked in the structure are driven into a vehicle receiving bay 8 which is located at the end of the structure adjacent to the lift 6.

A first conveyor unit 9 is located in the bay 8. The conveyor unit 9 is reversible and includes a pair of parallel sets of endless drive chains 10 which are coupled to be driven in unison from a motor (not shown). The chains 10 carry a plurality of dogs or other catch elements 11 which are intended to engage with vehicle or other load carrying trolleys or pallets 12 so as to move the pallets with the conveyors whatever the direction of motion of the conveyor unit 9. The unit 9 is such that the load receiving surfaces of the pallets are substantially at ground level. The construction of the conveyor chains, dogs and pallets will be described in greater detail hereafter. As shown in FIGURES 1 to 4 the conveyor unit 9 will transport the pallets 12 to and from the lift 6, in a direction transverse to the longitudinal direction, i.e. the direction of loading of the pallets.

Figures 2, 3:
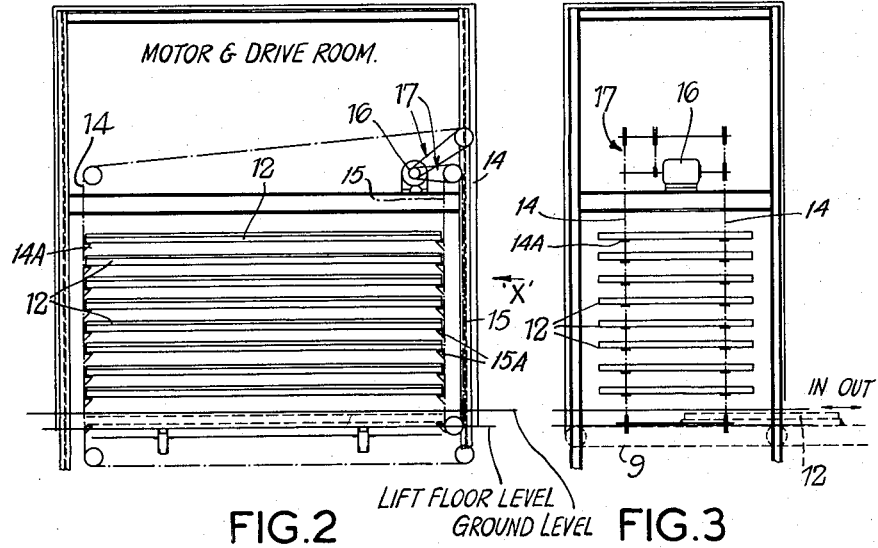
FIGURE 2 is an elevation to an enlarged scale of a detail of the structure of FIGURE 1.
FIGURE 3 is an end elevation taken in the direction "X" of the detail of FIGURE 2.

The pallets 12 are housed in a pallet store 13 which is intended to house a considerable number of pallets, for example 60. The store includes a pallet stacker unit which is illustrated in FIGURES 2 and 3. The stacker unit includes a housing containing a vertical conveyor unit including a first pair of parallel conveyor chains 14 and a second pair of parallel conveyor chains 15. The conveyor chains 14 and 15 carry dogs 14A, 15A and are connected to be driven in unison from a motor 16, via a suitable drive 17. The arrangement of the conveyor chains 14 and 15 is such that the pallets 12 which are introduced into the store by the conveyor unit 9 are moved vertically upwardly or downwardly as is required. The conveyor unit 9 is so related to the conveyor unit in the pallet store that pallets can be removed or introduced into the store as desired. In FIGURE 3 a pallet 12 is shown partially entered into the pallet store 13.

A further reversible conveyor unit 18 is provided in the floor of the lift 6 (FIGURE 4). The unit 18 which is driven by a motor (not shown) includes two side-by-side endless conveyor chains 19 carrying dogs 20 or other catch elements which will engage with a pallet 12. The unit 18 moves in a direction transverse to the unit 9, that is lengthwise of the lift 6. The conveyor units 9 and 18 are so related that the dogs 11 on the unit 9 will not foul the chains 19 of the unit 18. The constructional details of the conveyor units 9 and 18 are substantially identical to the construction of details of the conveyor units provided in or on the floors 2 or 3 of the structure and will be described in detail hereinafter.

One of the upper floors 3 is schematically illustrated in FIGURE 4. The floor 3 is divided into a plurality of storage spaces 21 each of which readily accommodates a pallet 12 by dividing the area of the floor 3 into a plurality of transverse lanes identified in FIGURE 4 as AB, BC, CD and DE respectively and into a plurality of longitudinal lanes identified in the figure as $ab$, $bc$, $cd$, $de$, $ef$ and $fg$. In the floor 3 shown in FIGURE 4 there are four transverse lanes and six longitudinal lanes thus covering twenty-four spaces 21. A conveyor unit 22 is installed in each transverse lane. Each conveyor unit 22 comprises two parallel endless drive chains 23 which are coupled to be driven in unison from a motor 24, the latter driving through a suitable drive 25. A conveyor unit 26 is provided in each one of the longitudinal lanes, each conveyor unit 26 including two parallel chains 27 which are connected to be driven in unison via a common drive 28 from an electric motor 29. The upper and lower lengths of the longitudinal conveyor chains 27 are arranged to pass beneath the upper length of the transverse conveyor chains 23 and above the lower length of the conveyor chains 23.

The conveyor chains 23 are provided with a plurality of dogs 30 or other catch elements which are intended to engage with the pallets 12. Similarly the chains 27 are provided with dogs 31 or other catch elements which are also adapted and arranged to engage with the pallets 12.

Referring now to FIGURE 5 this figure shows on an enlarged scale a schematic arrangement of the relative positioning and locations of the conveyor chains 23 and 27 in the floor 3. In the figure the tracks 32 define the positions of the chains 23 and the tracks 33 define the positions of the chains 27. The relative dimensions of a pallet 12 are indicated by the chain-line rectangle which is symmetrically positioned above the four intersections of the tracks 32 and 33.

The construction of a transverse conveyor 22 and its associated tracks 32 is shown in FIGURE 6. In this figure the finished surface of the floor is indicated at 34. FIGURE 6 also illustrates the relative positioning of the longitudinal conveyor chains 27, dogs 31 and associated upper and lower tracks of the conveyor unit 26. The section shown in FIGURE 7 illustrates the construction of the longitudinal conveyor unit 26 and its associated track 33 and in addition shows the relative positioning of the conveyor unit 22.

The chain 23 (see FIGURES 6 and 17) includes a plurality of links 35 which are connected together in end-to-end relationship by pins 36 to form a chain having a pitch determined by the distance between the centers of the connecting pins. The pins 36 carry wheels 37 which are located between the adjacent pairs of links 35. The wheels 37 roll on a horizontal track 38 which is formed by a raised portion in the base 38A of a U-shaped channel member 39 which is fixedly supported in girders 40 which are let into the floor 3, the upper surfaces of the girders 40 being flush with the finished floor level 34. At regular intervals along the length of each chain 23 a dog or other catch element 30 is pivotally connected to the chain. Each dog 30 has a pair of arms 41 which bridge the chain links 35. Into the rear end of each arm 41 is fixed a pin 42 which carries a wheel 43 which rolls on the base 38A of the member 39. The forward ends of the arms 41 are connected to the chain 23 via the connecting pins 36. The lengths of the pins are increased for this purpose and also to provide bearings for further wheels 43A.

Each dog 30 (see FIGURE 7) has a rearwardly and upwardly extending surface 46 which extends from the forward end of the dog 30 towards the rear end of the dog. The surface 46 terminates in a vertical surface 47 which serves as a pallet engaging surface. A fragmentary portion of a pallet 12 is illustrated in FIGURES 6 and 7 to show the positioned relationship of the surface 47 with respect to a pallet 12. A second inclined surface 48 is formed on the dog 30, this surface defining an abutment surface which is located rearwards of the surface 47.

The dogs 30 are so mounted in opposite pairs on the chain 23 (see FIGURE 4) that the surface 47 on one dog faces towards the other dog of the pair. This arrangement effectively forms two sets of dogs, the arrangement being such that when the chains are moved in one direction the surfaces 47 of one set of dogs 30 will engage the pallets 12, and when the chains 23 are moved in the reverse direction the surface 47 of the dogs 30 of the other set will engage with the pallets 12.

The diameter of each of the wheels 37 is smaller than that of the wheels 43 and 43A. The difference in diameters is accommodated by the difference in levels between the central portion 38 of the base 38A and the remainder of the base 38.

A closed-in rectangular housing 49 (see FIGURES 6 and 7) having two inwardly directed flanges or rails 50, which serve as a rolling track for the wheels 43 and 43A, is provided for the return track or under track of the chain 23. It will be noticed that in this position the conveyor chain runs free inasmuch as its wheels 37 are not in rolling contact with any part of the housing 49.

Each track 33 (see FIGURES 6 and 7) for the conveyor chains 27 of the longitudinal conveyor units 26 is formed from two channel-shaped girders 51 whose webs are vertical and whose flanges are horizontal. The girders 51 are positioned immediately beneath the horizontal flanges of the girders 40. The chain 27 (see FIGURES 7 and 18) is formed from a plurality of links 52 which are connected in end-to-end relationship by pins 53. A wheel 54 is rotatably journalled on each pin 53, the wheels being located between the links. The wheels 54 roll on a raised strip portion 55 in the base 56 of a U-shaped member 57 which extends longitudinally of the girders 51 and which is connected to the girders. The arms 58 of the member 57 terminate flush with the finished floor level 34 of the floor. The arms 58 are intersected by the member 39 at the regions of the intersections of the tracks 32 and 33. At each of the regions of intersection between the tracks 32 and 33 a recessed or hollowed section 59 of the base 56 of the member 57 is lowered relative to the remainder of the base 56. Each section 59 includes (see FIGURE 6) a horizontal portion 60 and inclined portions 61 and 62 which connect the portion 60 with the remainder of the base 56.

The dogs 31 are provided at regular intervals along each pallet chain 27. Each dog 31 has a body portion 63 with a pallet engaging head 64, and two arms 65 which are integrally connected with the portion 63. The arms 65 are parallel to each other and are separated by a distance which allows the arms to straddle the links 52 of the chain 27. The arms 65 are substantially in the form of right-angled plates. An outwardly directed pin 66 is fixedly secured in each arm 65, each pin being located within the angle of the arm. A wheel 67 is rotatably mounted on each pin 66, the wheel 67 being intended to roll on the base 56 of the member 57.

The arms 65 are pivotally connected to the chains 27 by means of certain of the pins 53 used to interconnect the links 52, these particular pins being of increased length for this purpose. The longer pins 53 are also sufficiently extended to act as bearings for wheels 68 which are intended to roll on the base 56. The wheels 67 and 68 are of the same diameter, but are of a greater diameter than the wheels 54. The difference in diameter is the same as the distance between the strip portion 55 and the remainder of the base 56.

By reason of the triangular construction of the arms 65 the end of the dog which carries the wheels 67 is able to tilt relative to the chain 27, thereby to vary the height of the surface 64 with respect to the axes of the conveyor chain connecting pins 53. In practice the wheels 67 are able to drop beneath the chain 27 so as to tilt the dog 31 relative to the chain. This tilted position of a dog 31 is shown in dashed lines in FIGURES 6 and 7. The tilting occurs when the wheels 67 have rolled down the inclined surface 61 onto the horizontal portion 60. The wheels 68 remain in their original path by reason of the "pull" in the links 52 of the conveyor chain which tends to maintain the in-line relationship between the links 52.

In the position of the dog 31 illustrated in the upper portions of FIGURES 6 and 7, the surface 64 is lowered sufficiently to pass beneath the base 38 of the channel member 39. The dogs 31 are arranged on the chains in alternate pairs, in such manner that one dog of the pair is able to tilt in a clockwise direction relative to the chain 27 and the other dog of the pair is able to tilt in an anti-clockwise direction relative to the chain 27. This arangement of the dogs on the chain effectively produces two sets of dogs, the dogs of one set drivingly engaging with the pallets 12 when the chain is moving in a first direction, and the dogs of the other set drivingly engaging with the pallets 12 when the chain is moving in the opposite direction. This arrangement ensures that the dogs 31 will not foul the conveyor chains 23. If a dog 31 does not immediately tilt the impact of the surface 64 with any part of the other conveyor will tend to tilt the dog 31 which is driving whatever the direction of conveyor movement.

The return or undertrack for the lower section of the chain 27 is formed by a hollow housing 69 (see FIGURES 6 and 7) which extends longitudinally of the floor 3. The housing 69 which is located immediately beneath the lowermost flanges of the girder 51 has two inwardly directed rails 70 which provide supporting tracks for the wheels 67 and 68. The wheels 68, in fact, provide the sole support for the lower section of the conveyor chain since the wheels 54 are not in rolling contact with the rails 70. The other wheels 67 of each dog 31 are maintained on contact with the rail 70 solely by the weight of the dogs.

The housing 49 of the lower section of the conveyor chain 23 is located immediately beneath the bottom of the housing 69.

In order to be able selectively to prevent the dogs 30 and the dogs 31 from engaging one or more of the pallets 12 in a modification of the fixed inclined track previously described, solenoid controlled devices may be provided whereby the dogs can be tilted so that they fail to engage with a pallet 12 even though the conveyor chains are moved in such direction as normally to effect the engagement. These devices are provided in order to be able to leave one or more pallets in a predetermined position whilst the other pallets are being moved by the conveyors.

The solenoid controlled devices for tilting the dogs as just referred to can be of substantially identical construction both for the dogs 30 and for the dogs 31. An example of such solenoid devices as applied to a dog 30 on a transverse chain 23 is shown in FIGURES 8, 9 and 10. The device essentially comprises a movable floor which includes a channel member 72 having a central base strip 73 which aligns with the central strip portion 38 of the base 38A of the member 39. The channel section member 72 replaces a short length of the channel member 39 in the track 32 for the conveyor chain 23. The floor has two alternative positions one in which the running surfaces for the rollers 43 and 43A are completed and one in which the running surfaces for the rollers 43A and 43 are effectively interrupted in such manner that the weight of the dog 30 will cause the dog to tilt downward relative to the chain 23 so that the pallet engaging surface 47 fails to abut a pallet. In the tilted position of the dog 30 the chain is supported by the rollers 37 in the vicinity of the tilted dog.

The member 72 is carried in members or troughs 74 which replace corresponding sections of the girders 40.

A metal frame 75 having a rectangular outline is located immediately beneath the channel member 72 the frame being reciprocable transversely of the channel member 72. The members or troughs 74 are slotted as at 76 to allow the reciprocation of the frame 75.

The frame 75 has end walls 77 which carry ball bearing units 78 which run in fixed guide tracks 79 connected to supports 80 which extend transversely of the track 32 and which engage the slots 76. The supports 80 are rigidly secured in position, for example, by being welded to the horizontal flanges 81 of the girders 82 which serve to enclose the frame 75.

The sides of the frame are enclosed by side walls 83. Two metal troughs 84 are mounted in the frames 75, each trough 84 extending longitudinally of the frame 75 and comprising two sloping end walls 85 and a horizontal flat base 86. The troughs 84 are so spaced and positioned in the frame 75 that when the latter is in the position shown in FIGURE 8, the troughs will line up with the slots in the channel member 72. As the frame 75 is located immediately beneath the base strip 73, the troughs 74 effectively provide a hollow chamber, recess or cavity in the base of the channel member 72 and thus the base 38A of the track channel member 32. Consequently the sloping walls 85 and the base 86 will act as supporting tracks for the wheels 43 on the chain 27 whenever they are positioned as shown in FIGURE 8.

Two rollers 87 are so journalled in the end walls 77 with their axis horizontal that the uppermost part 88 of the periphery thereof just intersects the plane of the upper surface of the base 38A of the member 39. That is to say the rollers 87 effectively replace the cut out strips of the member 72 when the rollers are in the position shown in FIGURE 9.

The frame 75 is carried upon a support 89 which is movable in suitable guides (not shown) transversely of the track 32. The movement of the support 89 is controlled by two solenoid units 90 and 91 having reciprocable armatures 92 and 93 respectively. The armatures 92 and 93 each carry rollers 94 which are arranged to co-act with the support 89. The electrical connections to the solenoids 90 and 91, which are not shown, are such that the armature of one solenoid is retracted the armature of the other solenoid is extended. In FIGURE 8 the armature 92 of the solenoid 90 is extended and the armature 93 of the solenoid 91 is retracted. In this position the frame 75 is positioned so that the troughs 74 line-up with the channel members 72 and 39, whereby the wheels 43 will drop into the troughs and will thus lower the pallet contacting surface 47 sufficiently to prevent engagement of the dog with the pallets. In FIGURE 9 the armature 92 is retracted and the armature 91 is extended. The frame 75 is thus moved to the position in which the rollers 87 line up with the channel members 72 and 39 whereby the wheels 43 and 43A will roll on the rollers 87 in the longitudinal direction thereof. The dog will thus be maintained in the position in which the pallet contacting surface 47 will engage with a pallet. The provision of the rollers 87 facilitates the movement of the frame 75.

In the conveyor system shown in FIGURE 4 a solenoid device as just described is located at each position where a dog 30 has to engage with the pallet 12 in order to move the pallet from longitudinal lane to longitudinal lane. In other words there are at least 4 such devices associated with each pallet space 21 defined by the intersections of the transverse and longitudinal lanes. Each solenoid device is located immediately beneath the dogs 30 when the latter are in the positions shown in FIGURE 4.

The construction of the pallet 12 is shown in FIGURE 11. The pallet has a generally rectangular outline and includes an all welded steel frame 96 fitted with eight heavy duty castors 97a and 97b which are arranged in a diamond or elliptical pattern. Each of the four outer castors 97a is arranged to be able to easily cross the floor tracks 32 and 33 while the load on the pallet is distributed among the remaining seven castors, thereby preventing castors from entering the tracks and thus jamming the movement of the pallet relative to the floor.

Conveniently the castors can be resiliently adjustable in height whereby a form of floating action is obtained whilst the pallet is in motion.

Two longitudinal strips 97 are secured to the top of the frame 96 so as to provide wheel track areas for the vehicles. Wheel stops, not shown, are provided for locating the vehicle. If desired, the whole surface area could be enclosed for the purposes of supporting other types of loads or articles which it is required to load onto the pallets, for example furniture, washing machines, cookers, and car components etc.

Pivotally mounted gravity controlled catch levers 98 (FIGURE 12) are attached to the underside of the pallet 12. Each lever 98 is in the form of a crank lever pivoted intermediate of the ends thereof to a lug 99 or the like secured to or forming part of the frame 96. The shorter arm 100 of the lever 98 is provided with an integral stop plate 101 which abuts the frame 96 and limits anti-clockwise movement of the lever 98. The lower face of the longer arm 102 of the lever 98 provides an inclined abutment surface 103, whilst the free end of the lever arm 102 terminates in a vertical abutment plate 104. The lower edge 105 of the side wall 106 of the pallet 12 provides a stop which limits the amount of clockwise movement of the lever 98 since the length of the arm is such that the upper edge of the plate 104 can contact the edge 105.

When the dogs 30 are moved towards the pallet in such direction that the abutment surfaces 48 face towards the surface 103, the dogs will not entrain the pallet since the mutual effect of the two inclined surfaces 48 and 103 will cause the lever 98 to tilt to allow the surfaces 48 and thus the dogs to move clear of the catch lever 98. This condition is shown in FIGURE 12. If the relationship between the dogs 30 and the pallet is such that the surfaces 47 on the dogs contact the plate 104, the stop plate 101 will prevent rotation of the lever 98 whereby the pallet will be entrained and will be moved by the conveyor unit 22.

The above described conveyor systems on each floor 2 or 3 are controlled by three distinct forms of control firstly a fully automatic control system in which a particular pallet 12 is automatically transferred from its storage position and fed to the lift 6 which automatically carries the pallet to a receiving bay and vice versa.

This fully automatic control system involves electric control circuitry which is not shown but which is arranged to actuate the conveyor drive motors 24, 29 etc., in the required sequence, actuate the dog control devices 71 and operate the lift 6 and its associated conveyors. The electrical control circuitry is such that all of the conveyor systems for each floor can be controlled from a central control position. If desired when an operator is employed the control position is preferably provided with an electrically operated and illuminated key plan by which an operator in control of the operation of the structure can position at will any load or vehicle to be parked. Alternatively the operator can be positioned so that he can see clearly the floor into which a load is to be introduced.

Secondly a semi-automatic control which in the event of failure of any item or unit in the conveyor system allows the discharge of all the pallets from the floor concerned in accordance with a pre-set operation code dealing with each type of failure which is likely to occur, and thirdly a hand control (not shown) which is utilisable in the event of a major i.e. a multiple breakdown in the conveyor system, and which allows manual control of any remaining operative components.

A convenient method of removing a particular parked car from a number of parked cars on a floor 3 will be described in relation to FIGURES 4 and 13 to 16. In these figures the pallets 12, carrying the parked vehicle (not shown) are as previously mentioned represented by hatchured rectangles. The particular pallet which carries the required vehicle or other load or article is identified by hatchuring of a greater intensity and by the reference 12A.

Upon setting the automatic control system into operation the lift 6 which is assumed to obtain a pallet 12 will, whatever its position in the lift well 7, initially move to the position in which it will discharge the pallet 12 into the pallet store 13. That is to say, the lift moves to the ground floor 2, and the conveyor unit 18 will move the pallet 12 towards the stacker unit. The conveyor chains 14 and 15 of the latter will move the already stacked pallets upwards so that the stacker is ready to receive the pallet 12 from the lift 6.

After delivery of the pallet to the store the lift is automatically moved to the correct floor. The control devices 71 associated with those dogs 30 which would entrain all of the pallets in longitudinal lane ab and the pallet 12A are operated so that the dogs become inoperative i.e., retracted so that their control surfaces 47 will not engage the plates 104.

Figure 13:
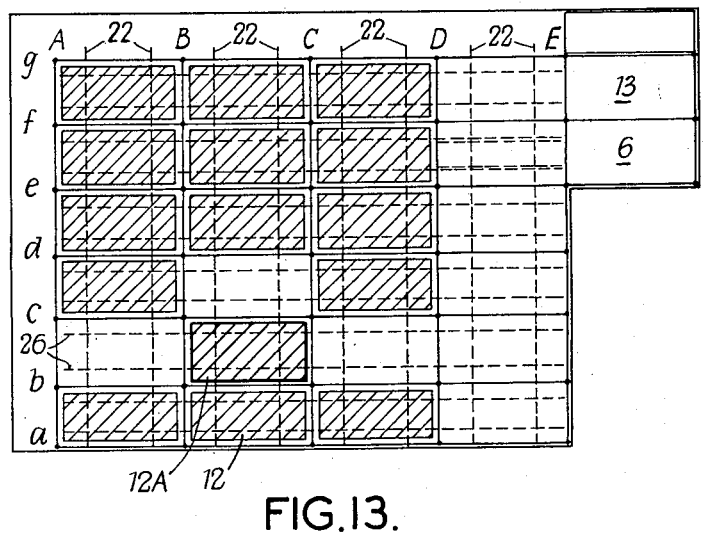

All of the transverse conveyor units 22 are then brought into operation so as to cause a movement of all of the other pallets to the positions shown in FIGURE 13. It will be noted that the pallet 12A is thus left in isolation on the longitudinal conveyor unit in longitudinal lane bc, since all of the other pallets which were originally in lane bc have been moved to longitudinal lane cd.

The longitudinal conveyor unit in lane bc is then set in a direction from left to right and the pallet 12A is moved into the transverse lane DE.

Figure 14:
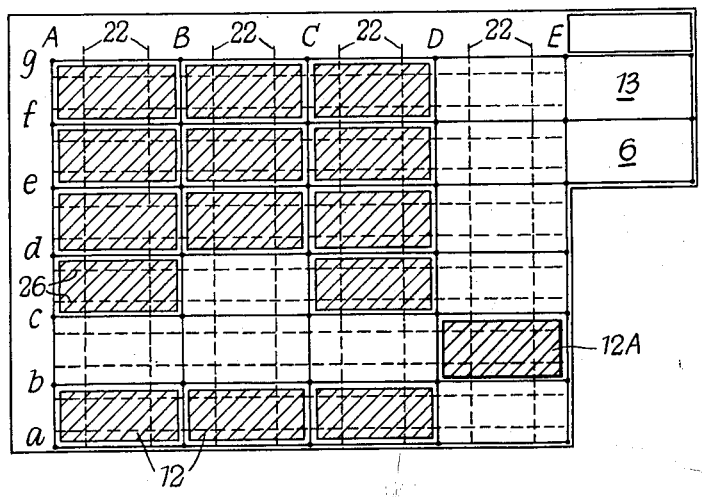
Figure 15:
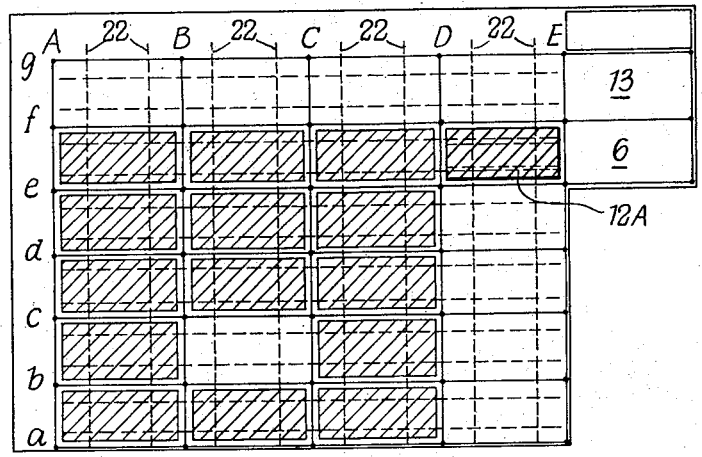

This position is shown in FIGURE 14.

The control devices 71 associated with the dogs 30 in the transverse lanes Ab, BC, CD are actuated to retract the dogs so that they will not engage with the pallets, and the transverse conveyor units are set into operation in order to move the pallet 12A from longitudinal lane bc into the longitudinal lane ef.

In order to return all of the other pallets to their original positions the dogs 30 of the conveyor unit 22 in transverse lane DE are retracted, and the transverse conveyor units brought into operation, the conveyor units moving in the reverse direction. This step is essential since the load or vehicle will be identifiable by the operator by means of a record of its original position on the floor.

Figure 16:
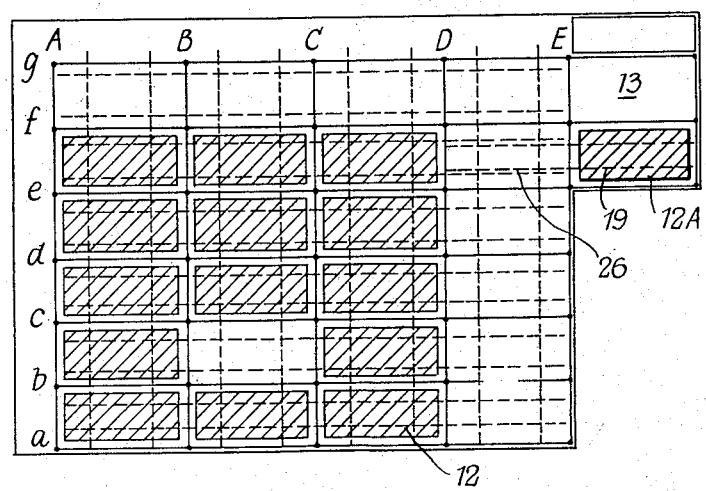

After the completion of this stage the pallet arrangement in the floor is as is shown in FIGURE 16.

The final stage is to operate the control devices 71 associated with the longitudinal conveyor unit 26 in the transverse lane DE so as to retract all of the dogs 31 except those dogs 31 which cooperate with the pallet 12A. The longitudinal conveyor unit 26 in lane DE is then brought into operation to feed the pallet 12A onto the conveyor unit 18 in the lift 6. This is shown in FIGURE 16 as soon as the pallet is correctly positioned on the lift 6, the latter moves towards the ground floor 2. The vehicle can then be driven directly out of the lift leaving the pallet 12A ready to receive a fresh load. If it is not possible to drive the vehicle out of the lift the conveyor unit 9 can be selectively operated to move the pallet 12A to a convenient position within the loading bay 8.

The operation parking a vehicle in a particular pallet space 21 is effected in the reverse manner. The various control devices 71, and conveyor unit drives being brought into operation in dependence upon the particular space 21 into which the vehicle is to be introduced. For example, it is assumed that a vehicle is travelling along the road upward with respect to FIGURE 6. The vehicle is driven across the pavement crossing to a position opposite the lift 6, or if the lift is engaged onto one of the pallets 12 on the conveyor unit 9. If the lift is not in use, the doors of the lift will be open and the vehicle can be driven straight into the lift, until the car is correctly positioned on the pallet, against the wheel stops which are provided for this purpose. The engine is switched off, the brakes applied, and the driver leaves the car which can be locked. In a fully automatically controlled structure the driver purchases a ticket from a machine which is arranged, on the receipt of money, to set into operation the fully automatic control system, or to give an indication to the operator that a car is to be parked. The various conveyor units and control devices are operated and the vehicle is parked in a convenient available space 21. The driver is provided with means of identifying his particular vehicle, for example a numbered disc or other token, which will be surrendered when the vehicle is required for use.

For safety purposes limit switches may be positioned wherever necessary, for example on the pallets 12 so that should the vehicle be located wrongly on the pallet and project beyond it the limit switches will keep out of circuit the operating mechanism. Similarly limit switches can be positioned on any stationary part of the structure and at intersection points of the conveyor system so that should either the operator misdirect a pallet 12 or for any reason the mechanism wrongly operates the whole of the apparatus is automatically brought to a stop.

The number of storage or parking space 21 can be as desired, for example, a floor could be provided with 120 such spaces, formed by twelve longitudinal lanes and ten transverse lanes, and of these a total of 99 can be fully utilised at any one time which is an equivalent of 83% of the floor space being used. The shaded area shows the area occupied by the parked vehicles leaving one transverse and one longitudinal lane always unoccupied.

In general the number of vehicles which can be parked on any one floor area is equal to the product of the number of parking spaces counted longitudinally minus one and the number of parking spaces counted transversely minus one.

This is necessitated by the need to keep one transverse lane, and one longitudinal lane free so as to maintain manoeuvrability on a floor. If desired the pallets 12 can be provided with a rear flap which is lowered to form a ramp up which the vehicle is driven, the ramp being lifted when a vehicle is on the pallet 12. The flap serves not only as a ramp but also acts as a tail gauge which in addition can serve when it is lifted up automatically to switch the lift into circuit ready for the commencement of a parking cycle or sequence.

As an alternative to castors or other type of runners on the pallets, the castors or other type of runners can be mounted on the floor so that the pallets can be pulled with the minimum of effort by the conveyor systems.

Instead of using solenoids for controlling the devices 71 rotary electro-magnetic devices may be used so as to provide the necessary power. Such rotary electro-magnetic devices may be of the kind adapted to make a predetermined angular movement (e.g. of 120° or 180°) each time they are energised.

Instead of using gravity controlled dogs 30 or 31 the dogs 30 or 31 can be suitably resiliently loaded.

On large floors to shorten the time required for the pallet travelling from a position situated diagonally opposite to the opening of the lift it will be possible to place the lift in any position in the centre of the floors and arrange for the L-shaped free area to be cross-shaped with lift feeds arranged on three sides of the lift.

The gravity controlled levers on the pallets can be replaced by cam means operated by torque motors or the like, which work against resiliently loaded dogs. Alternatively, a solenoid arrangement with a vertical stroke could be employed.

If desired the transverse conveyors could be split into relatively short conveyor lengths equal to the width of one of the parking spaces, clutch means preferably electro-magnetic being provided for causing operation of preselected sections of the shorter conveyors in order selectively to position or remove a pallet.

What I claim is:

1. A storage structure comprising a floor, multiple parallel conveyor means movable longitudinally of said floor, multiple, parallel conveyor means movable transversely of said floor, tracks in the floor for said conveyor means, each of said conveyor means having article engaging dogs, means for directing one of said conveyor means out of the plane of the other whereby one can pass under the other, articles engaging means on said conveyor means for engaging articles to be stored for movement by said conveyor means, longitudinally and transversely, means for automatically retracting dogs of one conveyor means whilst it is passing under the other conveyor means, said retracting means including track engaging wheels on the dogs and the tracks having recesses at predetermined positions which receive said track engaging wheels for retraction of the dogs.

2. A storage structure comprising a floor, multiple, parallel conveyor means movable longitudinally of said floor, multiple, parallel conveyor means movable transversely of said floor, tracks in the floor for said conveyor means, each conveyor means having article engaging dogs, means for directing one of said conveyor means out of the plane of the other whereby one can pass under the other, articles engaging means on said conveyor means for engaging articles to be stored for movement by said conveyor means longitudinally and transversely and control means for selectively retracting said dogs into a position in which when moved by their conevyor means they will be inoperative to engage an article.

3. A storage structure comprising a floor, multiple, parallel conveyor means movable longitudinally of said floor, multiple, parallel conveyor means movable transversely of said floor, tracks in the floor for said conveyor means, each of said conveyor means having article engaging dogs, means for directing one of said conveyor means out of the plane of the other whereby one can pass under the other, articles engaging means on said conveyor means for engaging articles to be stored for movement by said conveyor means longitudinally and transversely, means for automatically retracting dogs of one conveyor means whilst it is passing under the other conveyor means, said retracting means including track engaging wheels on the dogs and the tracks having recesses at predetermined positions which receive said track engaging wheels for retraction of the dogs and control means for selectively retracting said dogs into a position in which when moved by their conveyor means they will be inoperative to engage an article.

References Cited in the file of this patent
UNITED STATES PATENTS

| | | |
|---|---|---|
| 1,479,866 | Moores | Jan. 8, 1924 |
| 2,009,579 | Ewend | July 30, 1935 |
| 2,704,148 | Burrows | Mar. 15, 1955 |
| 2,848,121 | Semler | Aug. 19, 1958 |
| 2,924,343 | Isven | Feb. 6, 1960 |